INVENTOR.
Roland L. Curfman
BY
ATTORNEY

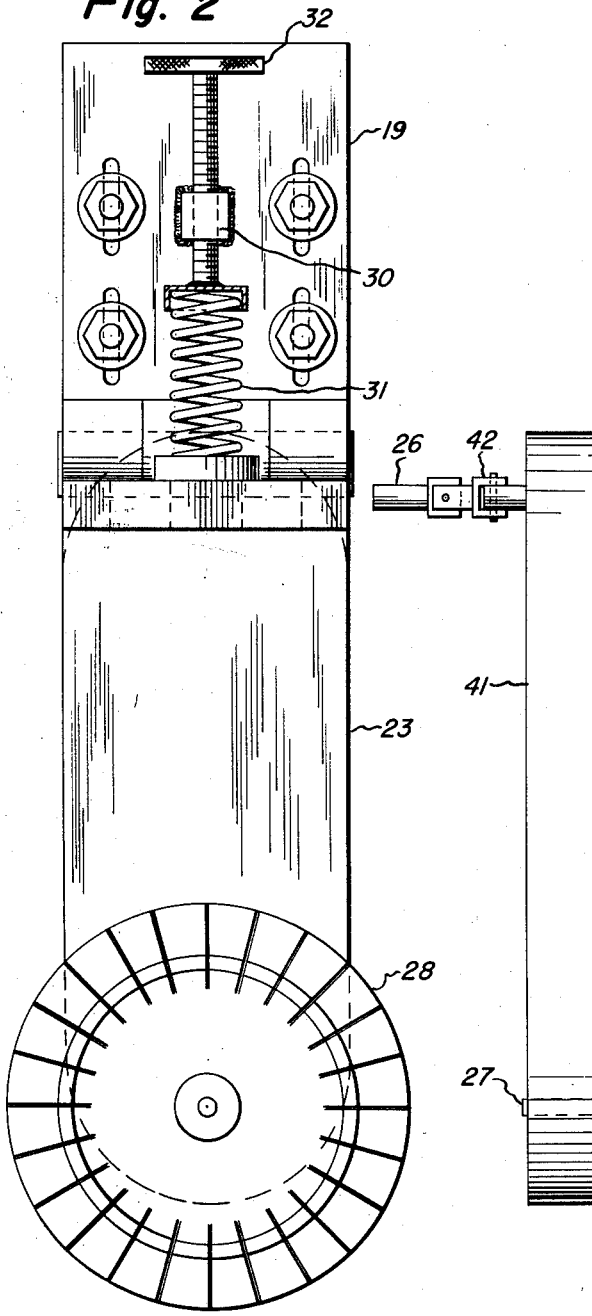
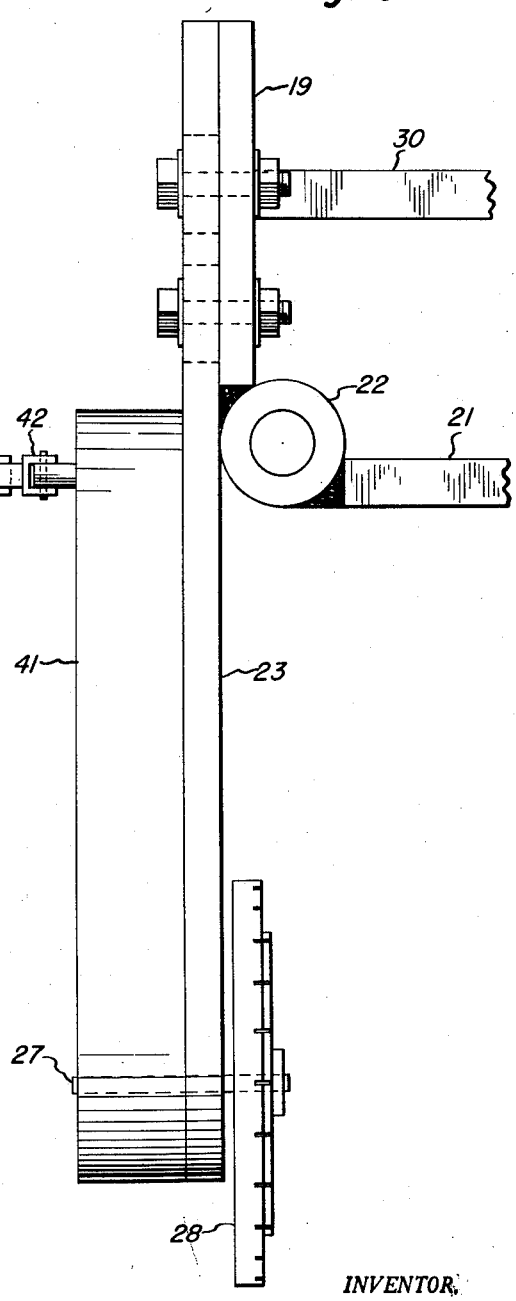

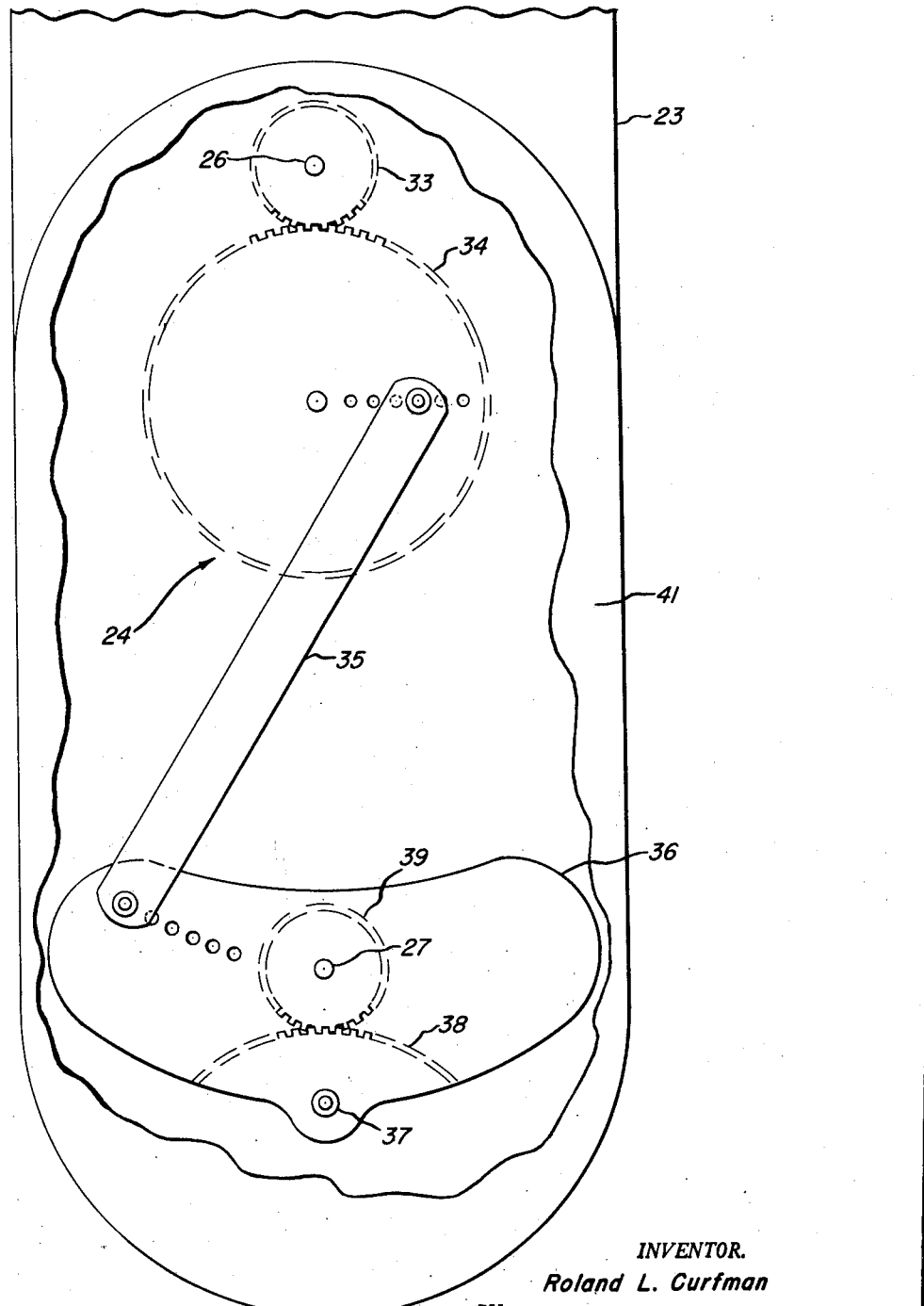

United States Patent Office 3,071,902
Patented Jan. 8, 1963

3,071,902
VALVE SEAT REFACING APPARATUS
Ronald L. Curfman, Mandan, N. Dak., assignor to Standard Oil Company, Chicago, Ill., a corporation of Indiana
Filed Sept. 26, 1960, Ser. No. 58,301
9 Claims. (Cl. 51—241)

This invention relates to apparatus for refacing valve seats and particularly it relates to apparatus for lapping valve seats in place in a valve body.

When valves are used in certain services over a period of time the surfaces of the valve disc and the valve seat tend to become irregular as a result of wear and corrosion. Frequently these effects necessitate either replacing these parts of the valve trim, or refacing them in order to obtain a satisfactory seal when the valve is closed off. Particularly, in the case of alloy trimmed valves, it is advantageous to reface the seating surfaces because of the high cost of replacement parts. In many instances it is only necessary to grind and lap the seating surfaces to obtain a satisfactory seal.

Various devices have been used in the past to reface the valve trim. However, the prior art devices require that the valve seats be removed from the valve body and lapped on a lapping table in order to be refaced or, if the device is capable of being used in place in the valve, the device is likely to worsen the condition of a valve seat containing a slightly irregular face because of the rotary motion developed by the device. In the latter instance it is possible for the grinding head to actually follow contours of the valve seat face and succeed in deepening an existing imperfection.

The general object of this invention is apparatus for refacing valve seats in a valve body, which apparatus eliminates the large amount of individual labor associated with hand lapping and provides true lapping cycles which eliminate the likelihood or irregular surfaces after lapping.

The apparatus of the present invention provides a reciprocating circular motion of an abrading wheel, which in turn allows true lapping cycles. This is attained by employing a mounting plate member adapted to maintain a fixed relationship between the refacing apparatus and a valve seat, a geared driving mechanism attached to the mounting plate which converts rotary motion applied to a drive shaft into reciprocating circular motion of a power shaft on which is mounted an abrading wheel. The abrading wheel is maintained in abrading contact with a valve seat by the application of a substantially constant force so that optimum conditions for lapping are obtained.

In a preferred embodiment of the present invention a pivoted mounting bracket is secured to the bonnet flanges of a gate valve and also secured to a base plate member having a gear mechanism mounted thereon. The gear mechanism is adapted to convert rotary motion applied to a drive shaft into reciprocating circular motion of a power shaft on which is mounted a suitable abrading wheel. The abrading wheel is maintained in abrading contact with a valve seat by the action of a spring member which serves to provide the desired abrading pressure against the valve seat.

My invention will be better understood by reference to the following description and to the accompanying drawings wherein is described a preferred embodiment of the present invention.

FIGURE 2 illustrates a front view of the valve refacing apparatus of FIGURE 1.

FIGURE 3 illustrates a side view of the apparatus of FIGURE 1.

FIGURE 4 is illustrative of a preferred geared driving mechanism employed in the apparatus of FIGURE 1.

Figure 1:
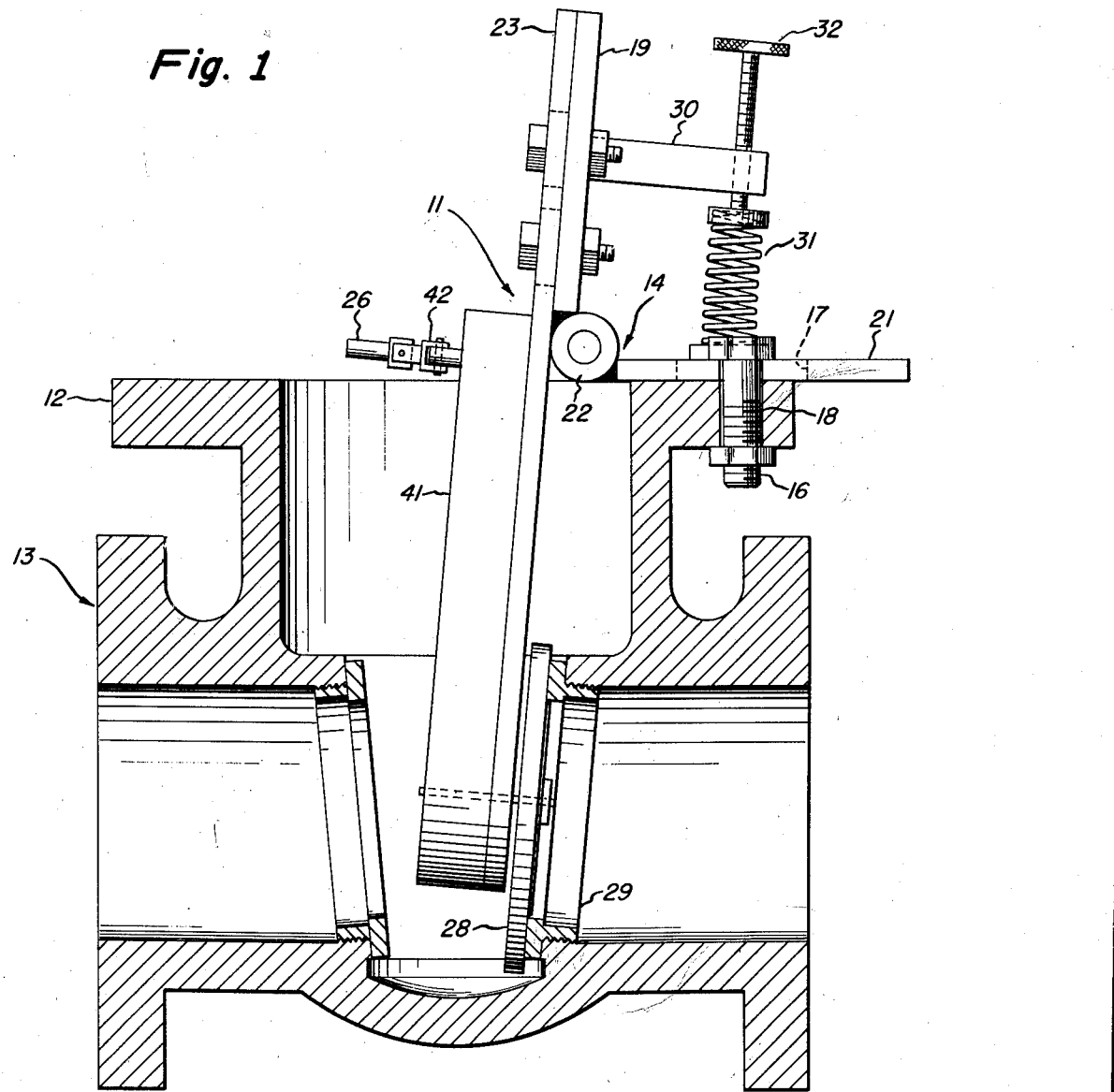
FIGURE 1 illustrates a cross-section of a typical gate valve with the preferred embodiment of my valve seat refacing apparatus secured in place by attachment to the bonnet flange of the valve.

Referring to FIGURE 1, the valve seat refacing apparatus 11 is secured on the bonnet flange 12 of a valve body 13 from which the valve disc has been removed. A mounting bracket 14 is secured to the flange 12 by mounting bolts 16 extending through bracket holes 17 and the bonnet flange bolt holes 18. Preferably the bracket holes 17 are slotted for adjustment of the apparatus 11 to the valve. The mounting bracket 14 preferably is comprised of two legs 19 and 21 which are pivotally connected by a swivel joint 22, with the first leg 21 being attached to the valve and the second leg 19 attached to a base plate 23, with slotted holes provided for adjustment to the valve. However, for the sake of convenience, the base plate may constitute one leg of the mounting bracket.

A geared driving mechanism 24, as shown in FIGURE 4, is attached to the base plate 23. The gear mechanism is of a suitable type to convert rotary motion applied to a drive shaft 26 by a hand crank, air motor, or suitable power source, into reciprocating circular motion of a power shaft 27 on which is mounted an abrading wheel 28, which may be a cast iron lapping plate, abrasive wheel, etc. The choice of the wheel to be used in removing metal from the valve seat will, of course, be determined by the initial condition of the valve seat, the stage of work and the degree of smoothness required on the final lapped surface.

The lapping wheel 28 is fitted against the surface of the valve seat 29 to establish abrading contact with the surface to be refaced. Advantageously, the pivoted connection 22 permits the apparatus to be adapted to different valve body patterns. The desired abrading pressure against the valve seat is maintained by the application of a substantially constant force acting on the lapping wheel 28 to maintain the desired contact with the valve seat 29. Although other constructions may be employed, it has been found preferable to accomplish this by the use of a spring member 31 as shown in FIGURES 1 and 2 wherein a spring positioning arm 30 attached to the leg 19 of the mounting bracket and the spring 31 provide for adjustment of the spring tension. The desired pressure may be obtained by turning the handle 32 to increase or decrease the spring tension which acts through the base plate 23 to increase or decrease the pressure of the lapping wheel 28 against the valve seat 29.

The lapping wheel 28 is self aligning so that it remains flat against the valve seat 29 even though considerable change of the tension adjustment changes the original position of the geared driving member 24. The alignment may be achieved by adjusting the position of the mounting bracket 14, and the power shaft 27 is preferably a flexible shaft, a U-jointed shaft, or the like.

Referring to FIGURE 4, a preferred gear arrangement for developing the desired reciprocating circular motion is shown. A flexible drive shaft 26 preferably containing a universal joint is connected to a primary drive wheel 33 which engages with a secondary drive wheel 34 which rotates when the drive shaft 26 is turned. A connecting arm 35 is pinned at one end to the secondary drive wheel 34 and at the other end to a rocker member 36 which is pivotally attached to the base plate 23 by pin 37. The rocker 36 is provided with a segmental primary driven wheel 38 which engages with a secondary driven wheel 39, or reciprocating drive wheel. Thus, as the drive shaft 26 is turned by a suitable power source, the rotary motion of the power source is converted into a reciprocating circular motion of the power shaft 27 keyed to the reciprocating drive wheel. This causes the lapping wheel 28 mounted on the power shaft 27, as shown in FIGURES 2 and 3, to move back and forth in a true lapping cycle, preferably through an angle of about 60°. However, the length of the lapping cycle can be varied by changing the pin connections of the connecting arm on the secondary drive wheel or on the rocker member as shown in FIGURE 4. For instance, near the center of the wheel the cycle will be short and by moving the connection toward the outer edge of the wheel the cycle will be lengthened.

The gear case 41 may be packed with grease for lubrication of the moving parts. The speed at which the lapping wheel 28 attached to the reciprocating power shaft 27 is moved can be controlled by varying the speed of the external power source or by changing the gear ratios in the gear case. The universal joint 42 employed in the drive shaft 26 enables the shaft to be readily attached to a power source.

A preferred embodiment of the apparatus referred to in the drawings and the above description was built and employed in the refacing of large sized valves used in a catalytic reforming unit. This apparatus included a gear case 41 having dimensions of about 3" x 6" x 16", a mounting bracket 14 having dimensions of about 1½" x 6" x 10" and a tension spring 31 having dimensions of about 1½" x 3". The abrading wheel 28 used for 8 inch 600 lb. gate valves was about 9½" in diameter.

These valves were refaced in place on the unit during a turnaround of the reformer by removing the valve bonnet and the valve disc and securing the mounting bracket to the bonnet flange of a valve as previously described. The valve seats were refaced and lapped in using a lapping plate and abrasive compound. After lapping, the valve were reassembled and placed in service when the unit was returned onstream. With the use of the above described apparatus the refacing of these valve seats was accomplished with a considerable savings of time and materials compared to the time normally required for refacing the valve seats by conventional methods, and the valves performed very satisfactorily in service.

Although the invention has been described with reference to particular embodiments thereof, it is to be understood that these are by way of illustration only and are not intended to limit the invention thereto, since alternative modes of operation and embodiment of the invention will become apparent to those skilled in the art without departing from the spirit and scope of the invention hereinbefore described.

Having described my invention, what I claim is:

1. In valve seat refacing apparatus, a mounting bracket having two legs, the first of said legs being adapted to be secured to the bonnet flange of a valve body and the second of said legs being adapted to be secured to abrading apparatus extending into said valve body, a base plate member attached to said second leg, a geared driving member having a series of gears mounted on said base plate, a drive shaft and a power shaft connected through said gears, said gears being arranged to convert rotary motion applied to said drive shaft into reciprocating circular motion of said power shaft, an abrading wheel member mounted on said power shaft to fit in abrading contact with a valve seat in said valve body, said wheel member being driven by said power shaft back and forth through a lapping cycle in a reciprocating circular manner, and constant force means adapted to maintain abrading contact between said wheel member and said valve seat.

2. Valve seat refacing apparatus comprising a mounting bracket having two legs pivotally connected together, one of said legs being adapted to be secured to the bonnet flange of a valve body and the other of said legs being adapted to be secured to abrading apparatus extending into said valve body, a base plate member attached to said mounting bracket, a geared driving member having a series of gears mounted on said base plate a drive shaft and a power shaft, connected through said gears, said gears being arranged to convert rotary motion applied to said drive shaft into reciprocating circular motion of said power shaft, a lapping wheel member mounted on said power shaft to fit in abrading contact with a valve seat in said valve body, said wheel being driven by said power shaft back and forth through a lapping cycle in a reciprocating circular manner and spring means acting on said abrading wheel member to maintain abrading contact between said abrading wheel member and said valve seat.

3. The apparatus of claim 2 wherein said power shaft is a flexible shaft.

4. The apparatus of claim 2 wherein said spring means is mounted between said legs of said mounting bracket and is provided with a tension adjusting member.

5. The apparatus of claim 2 wherein said geared driving member comprises a flexible drive shaft connected to a primary drive gear member, a secondary drive gear member engaged by said primary drive member, a connecting arm having one end pivotally connected to said secondary drive member, a rocker member pivotally connected to said base plate member and pivotally connected to the other end of said connecting arm, said rocking member being provided with a primary driven gear member, a secondary driven gear member engaging with said primary driven member, and a power shaft rigidly connected to said secondary driven member, whereby a reciprocating circular motion is imparted to said power shaft when said drive shaft is turned.

6. The apparatus of claim 5 wherein is provided means for varying the position of said connecting arm to alter the length of the lapping cycle provided by said reciprocating circular motion.

7. The apparatus of claim 2 wherein the length of said lapping cycle is about 60°.

8. Valve seat refacing apparatus comprising a mounting bracket having two legs pivotally connected together, one of said legs being adapted to be secured to the bonnet flange of a valve body and the other of said legs being adapted to be secured to abrading apparatus extending into said valve body, a base plate member attached to said mounting bracket, a geared driving member mounted on said base plate and including a flexible drive shaft connected to a primary drive gear member, a secondary drive gear member adapted to be engaged by said primary drive member, a connecting arm having one end pivotally connected to said secondary drive member, a rocker member pivotally connected to said base plate member and pivotally connected to the other end of said connecting arm, said rocking member being provided with a primary driven gear member, a secondary gear driven member engaging with said primary gear member, and a power shaft rigidly connected to said secondary driven member, whereby a reciprocating circular motion is imparted to said power shaft when said drive shaft is turned, and a lapping wheel mounted on said power shaft and adapted to fit in abrading contact with a valve seat in said valve body, and a spring member between said first leg and said second leg to maintain abrading contact between said abrading wheel member and said valve seat.

9. The apparatus of claim 8 wherein said geared drive member is arranged to provide a lapping cycle having a length of about 60°.

References Cited in the file of this patent

UNITED STATES PATENTS

| | | |
|---|---|---|
| 685,697 | Smith | Oct. 29, 1901 |
| 771,194 | Williams | Sept. 27, 1904 |
| 801,350 | Williams | Oct. 10, 1905 |
| 1,369,164 | Christopher | Feb. 22, 1921 |
| 2,408,280 | Wilcox | Sept. 24, 1946 |
| 2,627,175 | Scheele | Feb. 3, 1953 |
| 2,942,388 | Croft | June 28, 1960 |

FOREIGN PATENTS

| | | |
|---|---|---|
| 1,085,462 | France | Feb. 2, 1955 |
| 1,189,932 | France | Mar. 31, 1959 |